US012524295B2

(12) United States Patent
Wallrabe et al.

(10) Patent No.: US 12,524,295 B2
(45) Date of Patent: Jan. 13, 2026

(54) COMPUTER CLUSTER DOMAIN SPECIFIC OSI L2 DATA SOURCE INTEGRATION

(71) Applicant: Red Hat, Inc., Raleigh, NC (US)

(72) Inventors: Paul Wallrabe, Grasbrunn (DE);
Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 16 days.

(21) Appl. No.: 18/760,941

(22) Filed: Jul. 1, 2024

(65) Prior Publication Data

US 2026/0003724 A1  Jan. 1, 2026

(51) Int. Cl.
*G06F 11/07* (2006.01)
*H04L 1/00* (2006.01)
*H04L 69/324* (2022.01)

(52) U.S. Cl.
CPC ...... *G06F 11/0793* (2013.01); *G06F 11/0709* (2013.01); *H04L 1/0083* (2013.01); *H04L 69/324* (2013.01)

(58) Field of Classification Search
CPC ............. G06F 11/0709; G06F 11/0745; G06F 11/079; G06F 11/0793; H04L 1/0083; H04L 69/324
See application file for complete search history.

(56) References Cited

U.S. PATENT DOCUMENTS

| | | | | |
|---|---|---|---|---|
| 6,401,127 B1* | 6/2002 | Lei | .................. | H04L 1/1825 |
| | | | | 709/235 |
| 8,593,973 B2* | 11/2013 | Shukla | .................. | H04L 5/0085 |
| | | | | 370/242 |
| 10,764,214 B1* | 9/2020 | Plenderleith | ........ | H04L 43/0847 |
| 10,979,333 B2* | 4/2021 | Bernoth | .................. | H04L 67/52 |
| 11,687,420 B2* | 6/2023 | Lin | ..................... | G06F 11/0745 |
| | | | | 714/5.11 |

* cited by examiner

*Primary Examiner* — Joseph R Kudirka
(74) *Attorney, Agent, or Firm* — Womble Bond Dickinson (US) LLP

(57) ABSTRACT

A system and method of processing datasets that are compliant to a layer 2 (L2) protocol of an open systems interconnection (OSI) model in a cloud computing environment on behalf of an edge computing environment. The method includes receiving, from the edge computing device, a set of L2 frames. The method includes detecting one or more errors in the set of L2 frames based on an L2 protocol of the OSI model. The method includes correcting the one or more errors in the set of L2 frames to generate a corrected set of L2 frames. The method includes generating, by a processing device of a cloud computing system, a processed dataset based on the corrected set of L2 frames.

20 Claims, 6 Drawing Sheets

COMPUTER CLUSTER DOMAIN SPECIFIC OSI L2 DATA SOURCE INTEGRATION

TECHNICAL FIELD

The present disclosure relates generally to software technology, and more particularly, to systems and methods of computer cluster domain specific Open System Interconnection (OSI) Layer 2 (L2) data source integration.

BACKGROUND

The Open Systems Interconnection (OSI) model is a reference model from the International Organization for Standardization (ISO) that provides a common basis for the coordination of standards development for the purpose of systems interconnection. In the OSI reference model, the communications between systems are split into seven different abstraction layers: physical layer ("L1"), a data link layer ("L2"), a network layer ("L3"), a transport layer ("L4"), a session layer ("L5"), a presentation layer ("L6"), and an application layer ("L7"). Each intermediate layer serves a class of functionality to the layer above it and is served by the layer below it.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
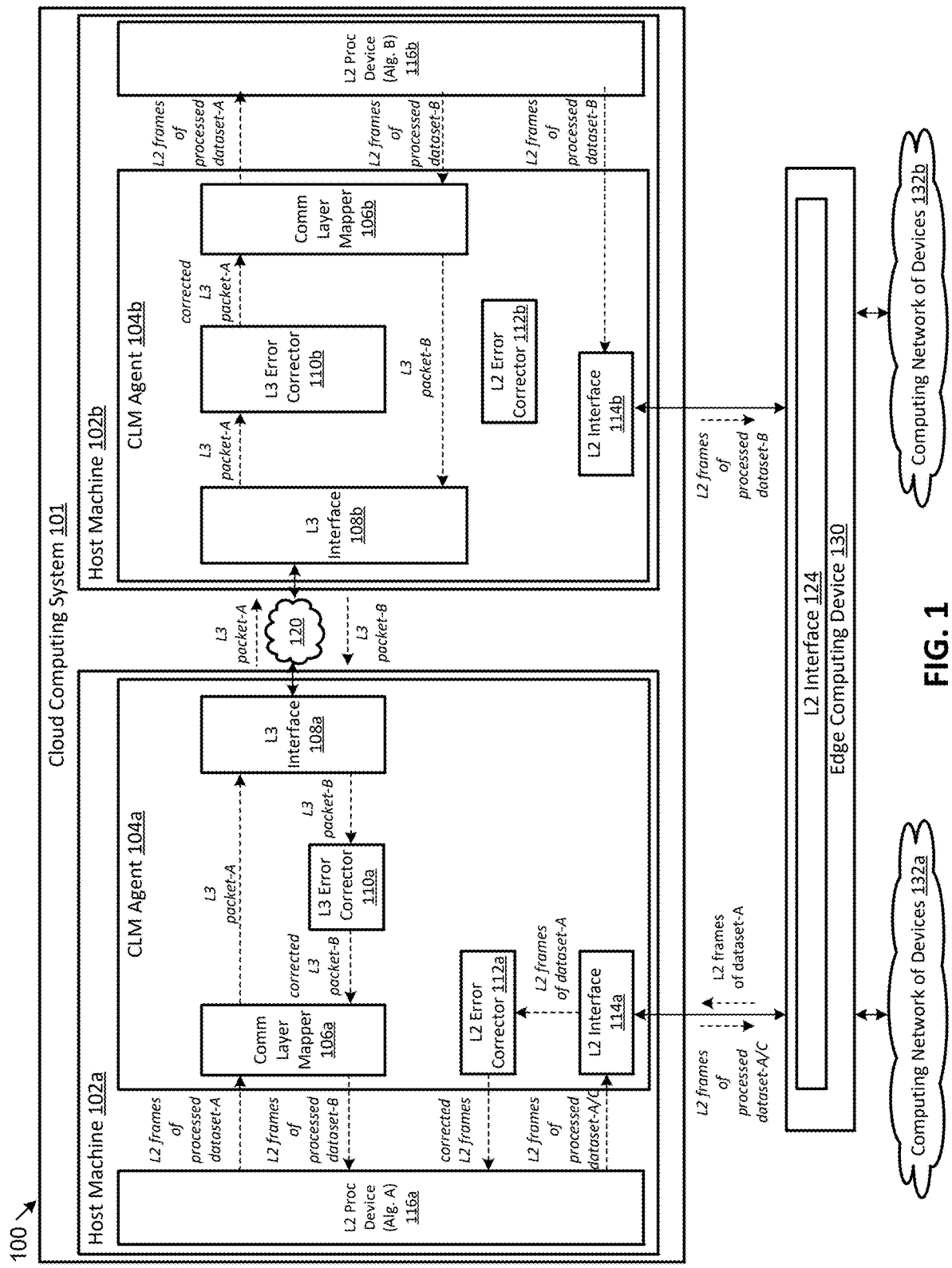
FIG. 1 is a block diagram depicting an example environment for processing datasets that are compliant to the L2 protocol of the OSI model in a cloud computing environment on behalf of an edge computing environment, according to some embodiments.

Various domain specific communication protocols rely on specific implementations on lower OSI layers. Based on the OSI reference model, the communications between a computing system are split into seven different abstraction layers. For example, in automotive the widely used Control Area Network (CAN) bus protocol has specifications for OSI layers 1, 2 and 7. Most cloud environments only work at OSI layer 3 (or above) and often require Transmission Control Protocol/Internet Protocol (TCP/IP) based communication in order to offer functionality such as load balancing or autoscaling. The same is true for Kubernetes (an open-source container orchestration system for automating software deployment, scaling, and management) where network plugins, network policies and a wide range of solutions have the same requirements.

Direct Ethernet frame manipulations, Virtual Local Area Network (VLAN) configurations, or Ethernet Media Access Control (MAC) address-based operations are possible, but come with a wide range of limitations mostly due to the abstractions of the underlying infrastructure details at a higher OSI layer. Besides Ethernet, various domain specific protocols that are relevant for edge operating on OSI layer 2 (e.g., CAN bus, FlexRay, Local Interconnect Network (LIN), Process Field Bus (PROFIBUS), modbus) face the same difficulties thus limiting the extension of cloud environments to the device edge.

Today there is the possibility to convert physical layers (e.g., media conversion) although requiring dedicated hardware to do so. A simple example of this could be converting a conventional twisted two-wire CAN bus cable to a fiber optic one or if done at the switch backplane, a CAN Small Form Factor (SFP) module would take the two CAN bus wires as input and convert them to Peripheral Component Interconnect Express (PCIe) used in the switch backend. Having a common backend on L1 of the OSI model, simplifies the following steps when the L1 frame is wrapped into any kind of suitable L2 protocol. Depending on the requirements this is implemented in hardware or software.

In order to expose these lower OSI layer protocols in the cloud, they would have to be wrapped into TCP/IP or UDP and the network architecture needs to be designed in a way that ensures that the requirements of the lower layer protocol are met. It could include caches and ordering of received packets before extracting their contents and more.

Extracting domain specific protocols from the payload without requiring changes to the application, requires imitating L2 interfaces in the cloud. For CAN there is Socket-CAN package, which allows the creation of virtual CAN interfaces.

Aspects of the present disclosure address the above-noted and other deficiencies by providing a mechanism for processing datasets that are compliant to the L2 protocol of the OSI model in a cloud computing environment on behalf of an edge computing environment. As discussed in greater detail below, the present disclosure describes a cloud layer management (CLM) agent that dynamically instantiates those virtual L2 devices in a cloud computing environment and/or a container environment (e.g., Kubernetes). The CLM agent also adds a virtual network topology on top of them using Kubernetes in order to be able to run entire sets of domain specific workloads that might require connectivity to each other. The CLM agent also includes a relay tool (a mapper) to establish a relationship between domain specific data sources (including adherence to their requirements) and traditional means of communication such as sockets, devices, files or pipes for Linux.

Furthermore, a dynamic instantiation of domain specific L2 devices can be done by advertising node level network device resources via device plugins to the Kubelet and may be limited to the maximum number of virtual network devices that can be created per network interface controller. The virtual network topology can establish links between a combination of two physical or domain specific L2 devices and could be implemented as a CNI plugin. The relay tool could possibly be an extension of the famous socat tool.

Benefits of the present embodiments include, for example, a simplification of network architecture by consolidating or centralizing compute resources. There is no need for a higher level abstraction (yet another higher protocol, often at L5-L7 abstracts lower layer communication) nor required changes to the application source code. It is the enabler for service based communication with high availability guarantees if applications are designed stateless or the state can easily be shared (e.g., network coding).

In an illustrative embodiment, a cloud computing system receives, from an edge computing device, a set of L2 frames. The cloud computing system detects one or more errors in the set of L2 frames based on an L2 protocol of an OSI model. The cloud computing system corrects the one or more errors in the set of L2 frames to generate a corrected set of L2 frames. The cloud computing system generates a processed dataset based on the corrected set of L2 frames.

FIG. 1 is a block diagram depicting an example environment for processing datasets that are compliant to the L2 protocol of the OSI model in a cloud computing environment on behalf of an edge computing environment, according to some embodiments. Environment 100 includes an edge computing device 130 that is communicatively coupled to one or more computing networks of devices (e.g., computing networks of devices 132a, computing networks of devices 132b), which may be an edge network and/or a mesh network. The environment 100 includes a cloud computing system 101 that includes host machines 102a, 102b (collectively referred to as host machines 102) that are each communicatively coupled together via a communication network 120.

The host machine 102a includes an L2 processing device 116a that is configured to generate an output (e.g., a processed dataset) by processing, according to a logic configuration or algorithm (algorithm A), a dataset that is compliant to the L2 protocol of the OSI model. The host machine 102b includes an L2 processing device 116b that is configured to generate an output (e.g., a processed dataset) by processing, according to a second algorithm (algorithm B), a dataset that is compliant to the L2 protocol of the OSI model.

In some embodiments, the L2 protocol of the OSI model carries data using Ethernet frames and the L3 protocol of the OSI model carries data using Internet Protocol (IP) packets.

Each of the host machines 102 include a cloud layer management agent 104 (e.g., CLM agent 104a, CLM agent 104b) that corrects errors in L2 frames and L3 packets, and then converts L2 frames to L3 packets and L3 packets to L2 frames. To support this functionality, each CLM agent 104 includes a communication layer mapper 106 (e.g., communication layer mapper 106a, communication layer mapper 106b), an L3 interface 108a (e.g., L3 interface 108a, L3 interface 108b), an L3 error corrector 110 (e.g., L3 error corrector 110a, L3 error corrector 110b), an L2 error corrector 112 (e.g., L2 error corrector 112a, L2 error corrector 112b), and an L2 interface 114 (e.g., L2 interface 114a, 114b).

The L2 interface 114a receives a set of L2 frames from the edge computing device 130, where the L2 frames collectively include a dataset (e.g., dataset-A). The L2 interface 114a forwards the set of L2 frames to the L2 error corrector 112a, which in turn, detects whether the L2 frames have errors based on the L2 protocol of the OSI model and generates a set of corrected L2 frames that correct any errors (if any) in the set of L2 frames. The L2 error corrector 112a sends the set of corrected L2 frames to the L2 processing device 116a, which in turn, generates a processed dataset (e.g., processed dataset-A) from the dataset-A and includes the processed dataset-A in a set of L2 frames. The L2 processing device 116a sends the set of L2 frames of processed dataset-A to the L2 interface 114a, which forwards the set of L2 frames to the edge computing device 130, via its L2 interface 124.

The L2 processing device 116a also sends the set of L2 frames of processed dataset-A to the communication layer mapper 106a, which generates an L3 packet (e.g., L3 packet-A) that includes the processed dataset-A. The communication layer mapper 106a sends the L3 packet-A to the L3 interface 108a, which in turn, forwards the L3 packet-A to the L3 interface 108b of the host machine 102b via the communication network 120. The L3 interface 108b forwards the L3 packet-A to the L3 error corrector 110b.

The L3 error corrector 110b detects whether the L3 packet-A has errors based on the L3 protocol of the OSI model and generates a corrected L3 packet that corrects any errors (if any) in the L3 packet-A, where the corrected L3 packet includes the processed dataset-A. The L3 error corrector 110b sends the corrected L3 packet-A to the communication layer mapper 106b, which generates a set of L2 frames that collectively include the processed dataset-A.

The L3 error corrector forwards the set of L2 frames to the L2 processing device 116b, which in turn, generates a processed dataset (e.g., processed dataset-B) from the processed dataset-A and includes the processed dataset-B in a set of L2 frames. The L2 processing device 116b sends the set of L2 frames to the L2 interface 114a, which forwards the set of L2 frames to the edge computing device 130, via its L2 interface 124.

The L2 processing device 116b also sends the set of L2 frames to the communication layer mapper 106, which generates an L3 packet (e.g., L3 packet-B) that includes the processed dataset-B. The communication layer mapper 106 sends the L3 packet-B to the L3 interface 108b, which in turn, forwards the L3 packet-B to the L3 interface 108a of the host machine 102a via the communication network 120. The L3 interface 108a forwards the L3 packet-B to the L3 error corrector 110a.

The L3 error corrector 110a detects whether the L3 packet-B has errors based on the L3 protocol of the OSI model and generates a corrected L3 packet that corrects any errors (if any) in the L3 packet-B, where the corrected L3 packet includes the processed dataset-B. The L3 error corrector 110a sends the corrected L3 packet-B to the communication layer mapper 106b, which generates a set of L2 frames that collectively include the processed dataset-B.

The communication layer mapper 106a forwards the set of L2 frames to the L2 processing device 116a, which in turn, generates a processed dataset (e.g., processed dataset-C) from the processed dataset-B and includes the processed dataset-C in a set of L2 frames. The L2 processing device 116a sends the set of L2 frames to the L2 interface 114a, which forwards the set of L2 frames to the edge computing device 130, via its L2 interface 124.

A dataset (e.g., dataset-A, processed dataset-A, processed dataset-B) may include data of any type (e.g., video data, audio data, image data, statistics, telecommunication data) and/or computing commands (e.g., update commands). For example, the dataset may include a command to cause a processing device (e.g., L2 processing device 116a, L2 processing device 116b) that is processing the dataset to update its algorithm according to the command.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

A host machine 102a and an edge computing device 130 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster, such as a Kubernetes cluster).

In some embodiments, an edge computing device 130 may be an electronic device (e.g., a sensor) that does not have the requisite hardware (e.g., processing unit, memory storage, etc.) to process (e.g., perform calculations, generate hash values, etc.) L2 datasets to generate an output.

A computing device may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). A computing device may use the same type or different types of virtual environments. For example, all of the computing devices may be VMs. In another example, all of the computing devices may be containers. In a further example, some of the computing devices may be VMs, other computing device may be containers, and other computing devices may be computing devices (or groups of computing devices).

Still referring to FIG. 1, the host machine 102a receives, from the edge computing device 130, a set of L2 frames. The host machine 102a detects one or more errors in the set of L2 frames based on an L2 protocol of an OSI model. The host machine 102a corrects the one or more errors in the set of L2 frames to generate a corrected set of L2 frames. The host machine 102a generates a processed dataset based on the corrected set of L2 frames.

Although FIG. 1 shows only a select number of computing devices (e.g., host machines 102, edge computing device 130), the environment 100 may include any number of computing devices that are interconnected in any arrangement to facilitate the exchange of data between the computing devices.

Figure 2A:
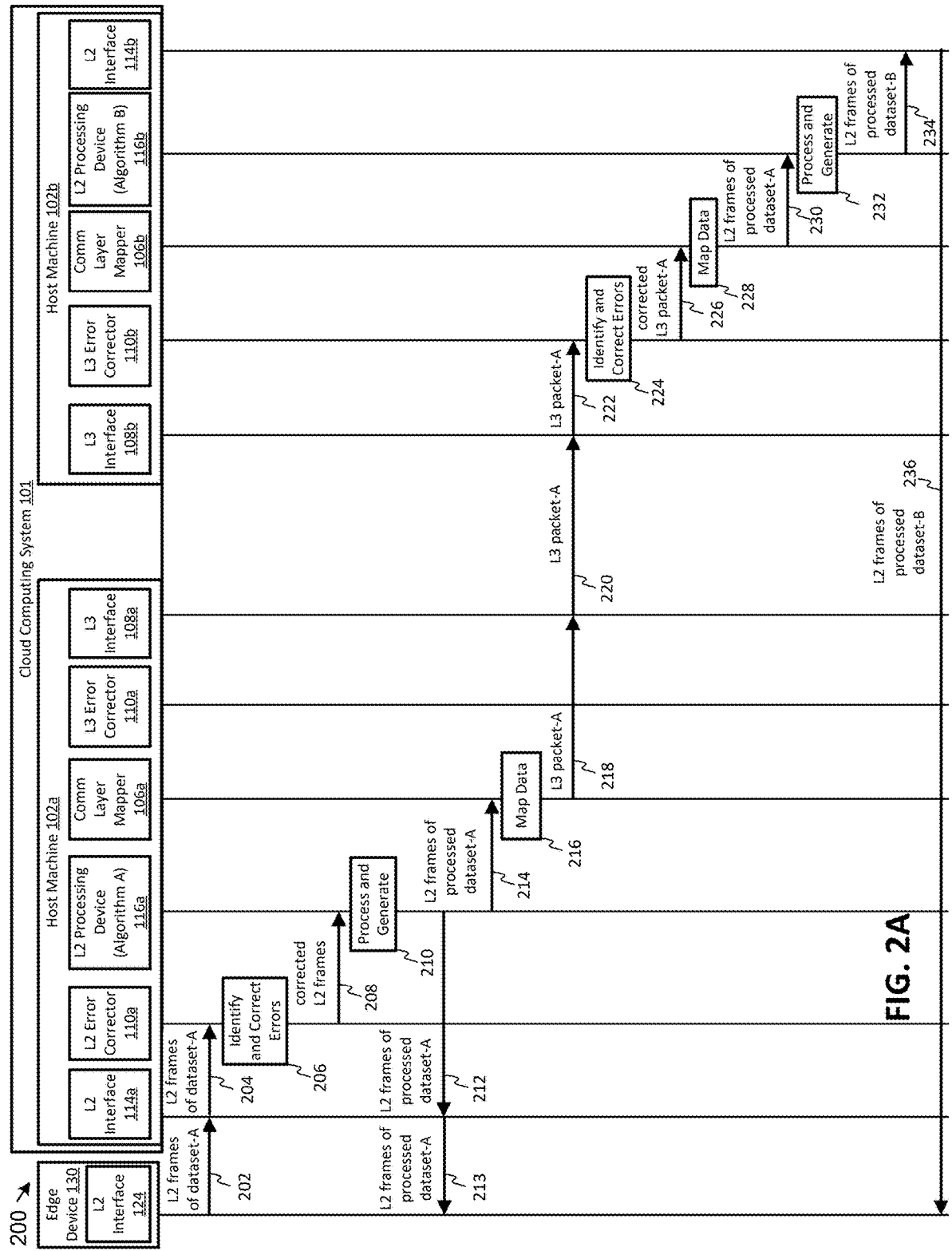
FIGS. 2A and 2B illustrate a timing diagram for processing datasets that are compliant to the L2 protocol of the OSI model in a cloud computing environment on behalf of an edge computing environment, according to some embodiments.
Figure 2B:
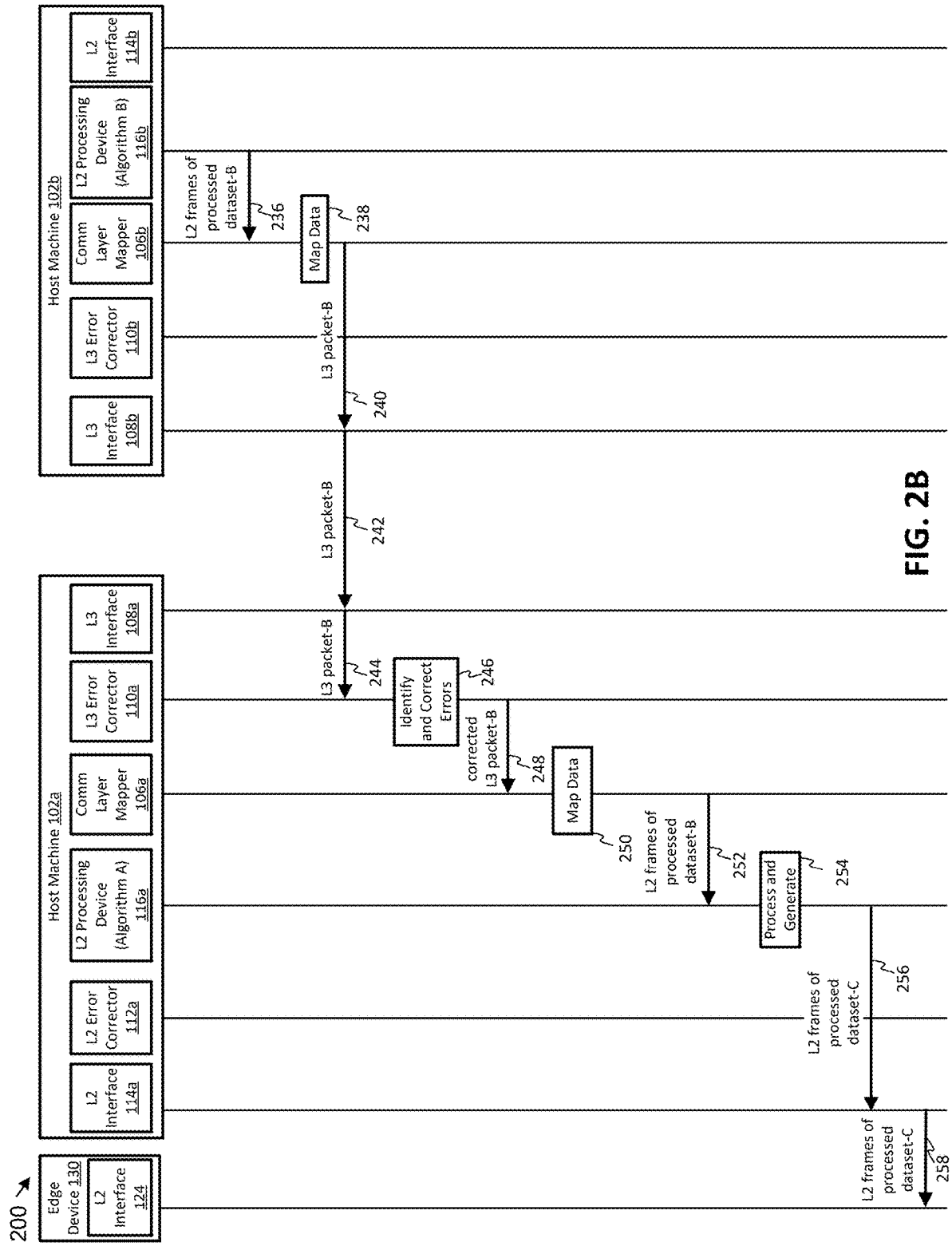

FIGS. 2A and 2B illustrate a timing diagram for processing datasets that are compliant to the L2 protocol of the OSI model in a cloud computing environment on behalf of an edge computing environment, according to some embodiments. The timing diagram 200 shows the signals and operations of host machines 102a, 102b (and their corresponding components) of the cloud computing system 101 and the edge computing device 130. The host machines 102a, 102b perform the operations shown in the timing diagram 200, so that the host machine 102a and/or host machine 102b can process datasets that are compliant to the L2 protocol of the OSI model in the cloud computing system 102 instead of the edge computing device 130 having to use its processing resources (if even available) to process theses datasets locally.

At operation 202, the edge computing device 130 generates a set of L2 frames (shown in FIG. 1, L2 frames of datasets) that include dataset-A and where the set of L2 frames are compliant to an L2 communication protocol, and sends, via the L2 interface 124, the set of L2 frames to the L2 interface 114a of the host machine 102a. The edge computing device 130 acquired the dataset-A from one or more devices of a computing network of devices (e.g., computing network of device 132a or computing network of devices 132a).

At operation 204, the host machine 102a sends, via the L2 interface 114a, the set of L2 frames to the L2 error corrector 110a.

At operation 206, the L2 error corrector 110a determines whether any of the attributes (e.g., timing, frame format, etc.) of the set of L2 frames fail to comply with the L2 communication protocol. If the L2 error corrector 110a identifies an error, then the L2 error corrector 110a can resolve the error in the set of L2 frames by generating a corrected set of L2 frames that include dataset-A, where the corrected set of L2 frames fully comply with the L2 communication protocol. For example, the L2 error corrector 110a may analyze each of the frames in the set of L2 frames to determine that there is a timing error between a pair of L2 frames in the set of L2 frames that violates the L2 communication protocol. In response, the L2 error corrector 110a adjusts (e.g., modifies) the timing between the pair of frames to generate a corrected set of frames that includes dataset-A and which conforms to the timing demands of the L2 communication protocol.

At operation 208, the L2 error corrector 110a sends the corrected set of L2 frames to the L2 processing device 116a. At operation 210, the L2 processing device 116a processes the corrected set of L2 frames according to algorithm A to generate a processed dataset (shown in FIG. 2A as processed dataset-A) from dataset-A. The L2 processing device 116a generates a set of L2 frames that include the processed dataset-A. At operation 212, the L2 processing device 116a sends the set of L2 frames of processed dataset-A to the L2 interface 114a of the host machine 102a. At operation 213, the L2 interface 114a sends the set of L2 frames of processed dataset-A to the edge computing device 130, which receives the set of L2 frames via its L2 interface 124.

As discussed below regarding operations 214 to 236, in some embodiments, the host machine 102a may determine that the processed dataset-A should not yet be shared with the edge computing device 130 because the processed dataset-A should undergo additional processing by another host machine (e.g., host machine 102b) to generate a second processed dataset for the edge computing device 130.

Specifically, at operation 214, the L2 processor sends the set of L2 frames of processed dataset-A to the communication layer mapper 106a. At operation 216, the communication layer mapper 106a transforms (e.g., maps, converts, translates) the set of L2 frames of processed dataset-A into an L3 packet (shown in FIG. 2A as L3 packet-A) that includes the processed dataset-A. At operation 218, the communication layer mapper 106a sends the L3 packet to the L3 interface 108a of the host machine 102. At operation 220, the L3 interface 108a sends the L3 packet to the L3 interface 108b of the host machine 102b.

At operation 222, the L3 interface 108b sends the L3 packet to the L3 error corrector 110b. At operation 224, the L3 error corrector 110b determines whether any of the attributes (e.g., timing, packet format, etc.) of the L3 packet-A fail to comply with the L3 communication protocol. If the L3 error corrector 110b identifies an error, then the L3 error corrector 110b can resolve the error in the L3 packet-A by generating a corrected L3 packet-A that includes the processed dataset-A, where the corrected L3 packet-A fully complies with the L3 communication protocol. At operation 226, the L3 error corrector 110b sends the corrected L3 packet-A to the communication layer mapper 106b.

At operation 228, the communication layer mapper 106b transforms (e.g., maps, converts, translates) the L3 packet-A into a set of L2 frames that collectively include the processed dataset-A. At operation 230, the communication layer mapper 106b sends the set of L2 frames to the L2 processing device 116b. At operation 232, the L2 processing device 116b processes the set of L2 frames according to algorithm B to generate a processed dataset (shown in FIG. 2A as processed dataset-B) from the processed dataset-A. The L2 processing device 116b generates a set of L2 frames that include the processed dataset-B. At operation 234, the L2 processing device 116b sends the set of L2 frames of processed dataset-B to the L2 interface 114b. At operation 236, the L2 interface 114b sends the processed dataset-B to the edge computing device 130, which receives the set of L2 frames via its L2 interface 124.

As discussed below regarding operations 236 to 258, in some embodiments, the host machine 102b may determine that the processed dataset-B should not yet be shared with the edge computing device 130 because the processed dataset-B should undergo additional processing by another host machine (e.g., host machine 1021) to generate a third processed dataset for the edge computing device 130.

Specifically, at operation 236, the L2 processor sends the set of L2 frames of processed dataset-B to the communication layer mapper 106a. At operation 238, the communication layer mapper 106b transforms (e.g., maps, converts, translates) the set of L2 frames of processed dataset-B into an L3 packet (shown in FIG. 2B as L3 packet-B) that includes the processed dataset-B. At operation 240, the communication layer mapper 106b sends the L3 packet-B to the L3 interface 108b of the host machine 102b. At operation 242, the L3 interface 108b sends the L3 packet-B to the L3 interface 108a of the host machine 102a.

At operation 244, the L3 interface 108a sends the L3 packet-B to the L3 error corrector 110a. At operation 246, the L3 error corrector 110a determines whether any of the attributes (e.g., timing, frame format, etc.) of the L3 packet-B fail to comply with the L3 communication protocol. If the L3 error corrector 110a identifies an error, then the L3 error corrector 110a can resolve the error in the L3 packet-B by generating a corrected L3 packet (shown in FIG. 2B as corrected L3 packet-B) that includes the processed dataset-B, where the corrected L3 packet fully complies with the L3 communication protocol.

At operation 248, the L3 error corrector 110a sends the corrected L3 packet-B to the communication layer mapper 106a. At operation 250, the communication layer mapper 106a transforms (e.g., maps, converts, translates) the corrected L3 packet-B into a set of L2 frames that collectively include the processed dataset-B. At operation 252, the communication layer mapper 106a sends the set of L2 frames to the L2 processing device 116a.

At operation 254, the L2 processing device 116a processes the set of L2 frames of according to algorithm A to generate a processed dataset (shown in FIG. 2B as processed dataset-C) from the processed dataset-B. The L2 processing device 116a generates a set of L2 frames that include the processed dataset-C. At operation 256, the L2 processing device 116a sends the set of L2 frames of processed dataset-C to the L2 interface 114a. At operation 258, the L2 interface 114a sends the processed dataset-C to the edge computing device 130, which receives the set of L2 frames via its L2 interface 124.

Figure 3:
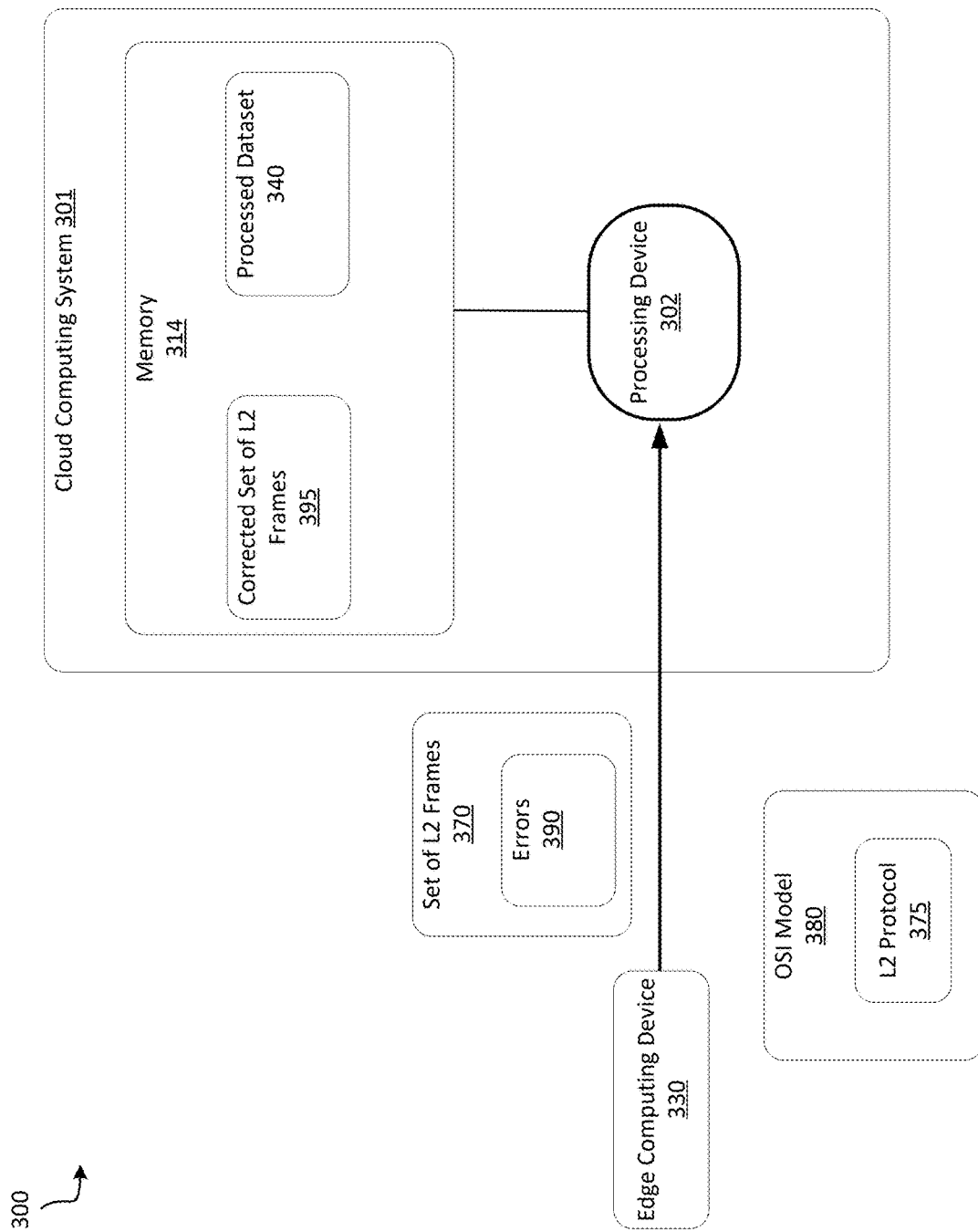
FIG. 3 is a block diagram depicting an example environment for using one or more cloud layer management agents in a cloud computing system to process dataset on behalf of an edge computing environment, according to some embodiments.

FIG. 3 is a block diagram depicting an example environment for using one or more cloud layer management agents in a cloud computing system to process dataset on behalf of an edge computing environment, according to some embodiments. The cloud computing system 301 includes a memory 314; and a processing device 302 that is operatively coupled to the memory 314. The processing device 302 is configured to receive, from an edge computing device 330, a set of L2 frames 370. The processing device 302 is configured to detect one or more errors 390 in the set of L2 frames 370 based on an L2 protocol 375 of an OSI model 380. The processing device 302 is configured to correct the one or more errors 390 in the set of L2 frames 370 to generate a corrected set of L2 frames 395. The processing device 302 is configured to generate a processed dataset 340 based on the corrected set of L2 frames 395.

Figure 4:
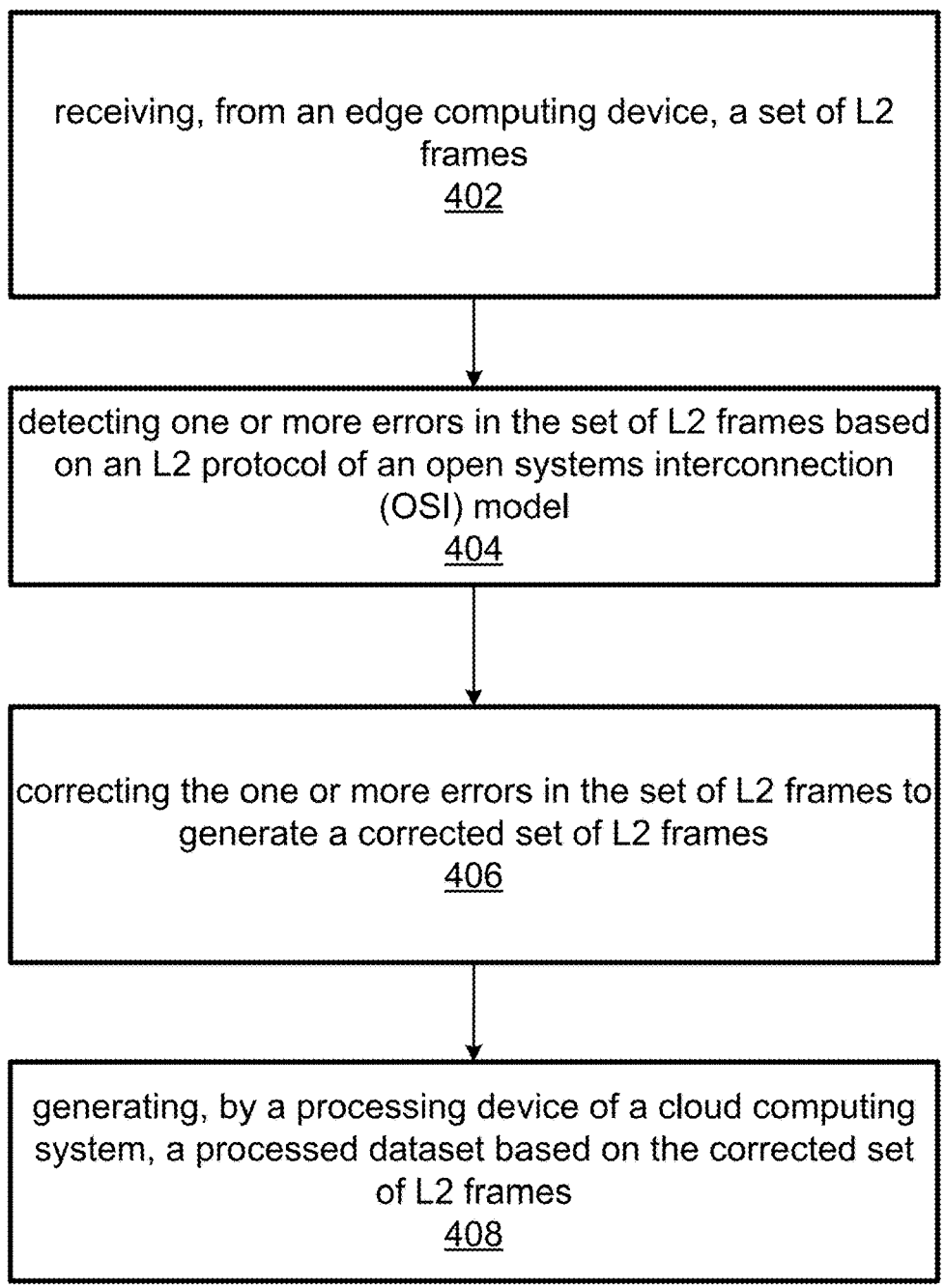
FIG. 4 is a flow diagram depicting a method of processing datasets that are compliant to the L2 protocol of the OSI model in a cloud computing environment on behalf of an edge computing environment, according to some embodiments.

FIG. 4 is a flow diagram depicting a method of processing datasets that are compliant to the L2 protocol of the OSI model in a cloud computing environment on behalf of an edge computing environment, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by one or more host machines, such as host machines 102a, 102b in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of receiving, from an edge computing device, a set of L2 frames. The method 400 includes the block 404 of detecting one or more errors in the set of L2 frames based on an L2 protocol of an OSI model. The method 400 includes the block 406 of correcting the one or more errors in the set of L2 frames to generate a corrected set of L2 frames. The method 400 includes the block 408 of generating, by a processing device of a cloud computing system, a processed dataset based on the corrected set of L2 frames.

Figure 5:
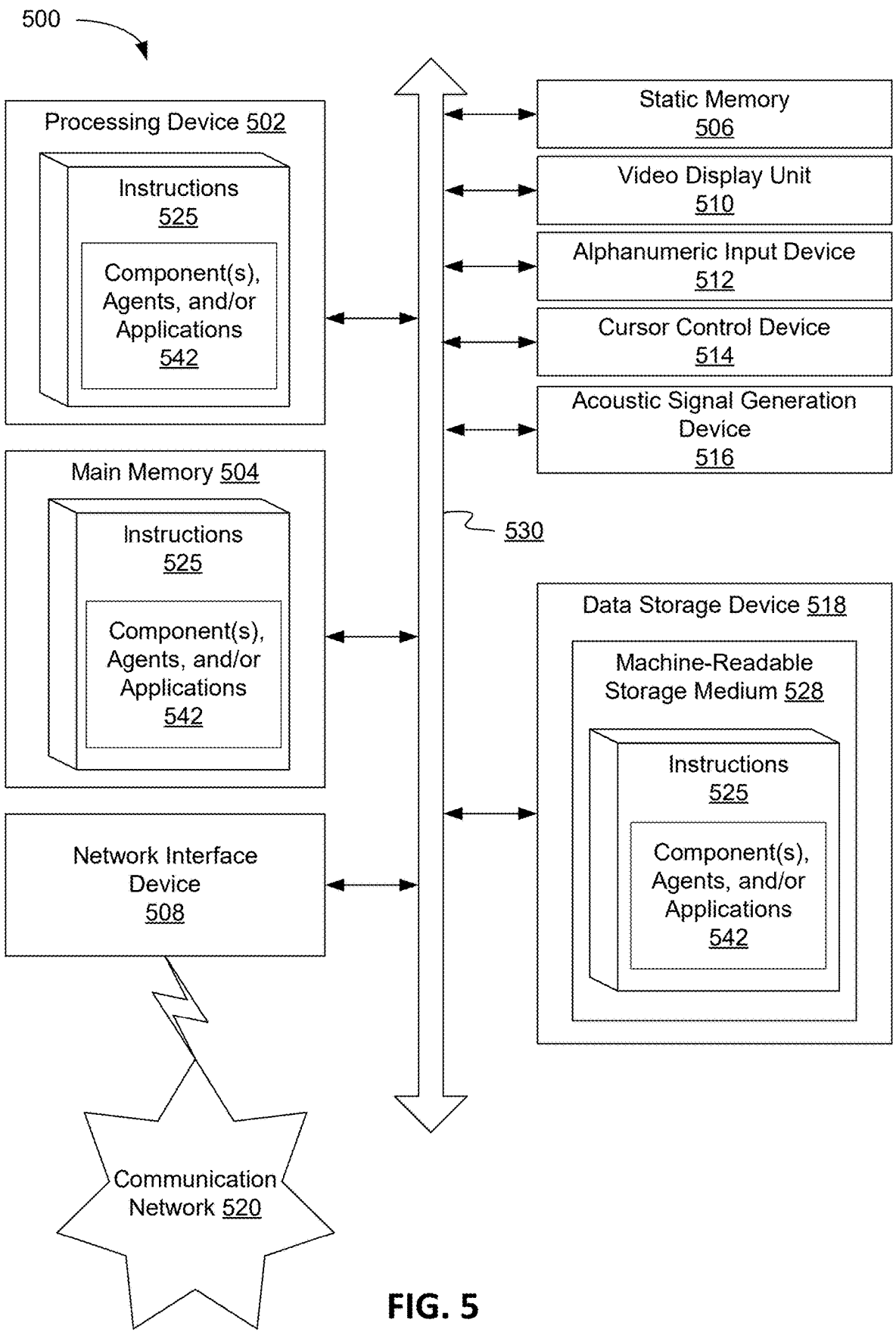
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components, agents, and/or applications 542 (e.g., probe request agent 107, probe platform 109, host monitor agent 105, CCM agent 106 in FIG. 1) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving" "acquiring," "receiving," "detecting," "correcting," "generating," "providing," "installing," "measuring," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:
   receiving, from an edge computing device, a set of layer 2 (L2) frames;
   detecting one or more errors in the set of L2 frames based on an L2 protocol of an open systems interconnection (OSI) model;
   correcting the one or more errors in the set of L2 frames to generate a corrected set of L2 frames; and
   generating, by a processing device of a cloud computing system, a processed dataset based on the corrected set of L2 frames.

2. The method of claim 1, further comprising:
   generating a second set of L2 frames comprising the processed dataset; and
   providing, via an L2 interface of the cloud computing system, the second set of L2 frames to the edge computing device.

3. The method of claim 1, wherein generating the processed dataset based on the corrected set of L2 frames is further based on a logic configuration that is associated with the edge computing device and installed on a memory of the processing device, and further comprising:
   receiving, via a layer 3 (L3) interface of the cloud computing system, a request to update the logic configuration based on a different logic configuration associated with the edge computing device; and
   installing the different logic configuration on the memory.

4. The method of claim 1, wherein detecting the one or more errors in the set of L2 frames further comprises:
   measuring a timing difference between a first L2 frame of the set of L2 frames and a second L2 frame of the set of L2 frames; and
   comparing the timing difference and the L2 protocol of the OSI model to determine that the timing difference violates the L2 protocol of the OSI model.

5. The method of claim 1, further comprising:
   generating a set of layer 3 (L3) packets comprising the processed dataset; and
   transmitting, via a first L3 interface of the cloud computing system, the set of L3 packets to a second L3 interface of the cloud computing system.

6. The method of claim 5, further comprising:
   detecting a transmission error in the set of L3 packets based on an L3 protocol of the OSI model responsive to transmitting the set of L3 packets;
   correcting the transmission error in the set of L3 packets to generate a corrected set of L3 packets comprising the processed dataset; and
   generating, by the cloud computing system, a second processed dataset based on the corrected set of L3 packets.

7. The method of claim 6, further comprising:
   generating, by the cloud computing system, a third set of L2 frames comprising the second processed dataset; and
   providing, by the cloud computing system via an L2 interface of the cloud computing system, the third set of L2 frames to the edge computing device.

8. The method of claim 6, further comprising:
   generating, by the cloud computing system, a second set of L3 packets comprising the second processed dataset; and
   transmitting, via the second L3 interface of the cloud computing system, the second set of L3 packets to the first L3 interface of the cloud computing system.

9. The method of claim 8, further comprising:
   generating, by the cloud computing system, a third processed dataset based on the second set of L3 packets.

10. The method of claim 1, wherein the cloud computing system comprises a Kubernetes cluster of computing devices.

11. A cloud computing system, comprising:
a memory; and
a processing device, operatively coupled to the memory, to:
receive, from an edge computing device, a set of layer 2 (L2) frames;
detect one or more errors in the set of L2 frames based on an L2 protocol of an open systems interconnection (OSI) model;
correct the one or more errors in the set of L2 frames to generate a corrected set of L2 frames; and
generate a processed dataset based on the corrected set of L2 frames.

12. The cloud computing system of claim 11, further comprising:
an L2 interface; and
wherein the processing device is further to:
generate a second set of L2 frames comprising the processed dataset; and
provide, via the L2 interface, the second set of L2 frames to the edge computing device.

13. The cloud computing system of claim 11, further comprising:
a layer 3 (L3) interface; and
wherein to generate the processed dataset based on the corrected set of L2 frames is further based on a logic configuration that is associated with the edge computing device and installed on the memory; and
wherein the processing device is further to:
receive, via the L3 interface, a request to update the logic configuration based on a different logic configuration associated with the edge computing device; and
install the different logic configuration on the memory.

14. The cloud computing system of claim 11, wherein to detect the one or more errors in the set of L2 frames, the processing device is further to:
measure a timing difference between a first L2 frame of the set of L2 frames and a second L2 frame of the set of L2 frames; and
compare the timing difference and the L2 protocol of the OSI model to determine that the timing difference violates the L2 protocol of the OSI model.

15. The cloud computing system of claim 11, further comprising:
a first layer 3 (L3) interface; and
wherein the processing device is further to:
generate a set of L3 packets comprising the processed dataset; and
transmit, via the first L3 interface, the set of L3 packets to a second L3 interface of the cloud computing system.

16. The cloud computing system of claim 15, wherein the processing device is further to:
detect a transmission error in the set of L3 packets based on an L3 protocol of the OSI model responsive to transmitting the set of L3 packets;
correct the transmission error in the set of L3 packets to generate a corrected set of L3 packets comprising the processed dataset; and
generate a second processed dataset based on the corrected set of L3 packets.

17. The cloud computing system of claim 16, further comprising:
an L2 interface; and
wherein the processing device is further to:
generate a third set of L2 frames comprising the second processed dataset; and
provide, via the L2 interface, the third set of L2 frames to the edge computing device.

18. The cloud computing system of claim 16, wherein the processing device is further to:
generate a second set of L3 packets comprising the second processed dataset; and
transmit, via the second L3 interface, the second set of L3 packets to the first L3 interface of the cloud computing system.

19. The cloud computing system of claim 11, further comprising:
a Kubernetes cluster of computing devices.

20. A non-transitory computer-readable medium storing instructions that, when executed by a processing device of a cloud computing system, cause the processing device to:
receive, from an edge computing device, a set of layer 2 (L2) frames;
detect one or more errors in the set of L2 frames based on an L2 protocol of an open systems interconnection (OSI) model;
correct the one or more errors in the set of L2 frames to generate a corrected set of L2 frames; and
generate, by the processing device, a processed dataset based on the corrected set of L2 frames.

* * * * *